United States Patent [19]

Vig

[11] Patent Number: 5,911,131
[45] Date of Patent: Jun. 8, 1999

[54] COMPUTER AIDED CALCULATION, APPRAISAL AND VALUATION OF WORKS OF ART

[76] Inventor: Tommy Vig, 18212 Nordhoff St., Northridge, Calif. 91325

[21] Appl. No.: 08/575,936

[22] Filed: Dec. 20, 1995

[51] Int. Cl.[6] ............................. G06F 17/00; G06F 17/60
[52] U.S. Cl. ................................ 705/1; 705/10; 705/20; 705/29; 705/27
[58] Field of Search ..................................... 395/201, 204, 395/207, 208, 209, 210, 211, 214, 220, 221, 222, 226, 227, 228, 229, 240, 242, 245, 464.1; 705/1, 4, 7, 8, 9, 10, 11, 14, 20, 21, 22, 26, 27, 28, 29, 40, 42, 45, 400; 235/378, 61 M; 364/464.1, 479.08, 156

[56] References Cited

U.S. PATENT DOCUMENTS

| | | | |
|---|---|---|---|
| 4,191,472 | 3/1980 | Mason | 356/243 |
| 4,464,122 | 8/1984 | Fuller et al. | 434/262 |
| 5,083,270 | 1/1992 | Gross et al. | 395/235 |
| 5,224,176 | 6/1993 | Crain | 382/136 |
| 5,307,260 | 4/1994 | Watanabe et al. | 395/500 |
| 5,365,425 | 11/1994 | Torma et al. | 395/202 |
| 5,383,129 | 1/1995 | Farrell | 364/464.1 |
| 5,493,677 | 2/1996 | Balogh et al. | 395/615 |
| 5,504,674 | 4/1996 | Chen et al. | 395/204 |
| 5,546,564 | 8/1996 | Horie | 395/500 |
| 5,570,292 | 10/1996 | Abraham et al. | 364/473.01 |
| 5,625,776 | 4/1997 | Johnson | 395/227 |
| 5,664,111 | 9/1997 | Nahan et al. | 705/27 |

FOREIGN PATENT DOCUMENTS

| | | |
|---|---|---|
| 59-85568 | 5/1984 | Japan . |
| 59-94162 | 5/1984 | Japan . |

OTHER PUBLICATIONS

Taking the Risk Out of Fire Risk Underwriting, Feb. 1989 AIWEEK.

*Primary Examiner*—David R. Hudspeth
*Assistant Examiner*—Joseph Thomas
*Attorney, Agent, or Firm*—Tommy Vig

[57] ABSTRACT

A computer aided method for calculating, valuating and appraising the value of artworks. The basic steps of the appraisal method include providing an appraisal structure of a multiplicity of "value-affecting" factors, where each factor is further divided into a plurality of levels each assigned a relative percentage rate, establishing a database of all known artworks of all known artists, including each artist's personal information, prior sales information and individual circumstances that also affect the prices of the artist's artworks, creating an imaginary "normal" artwork by each artist which has a "normal" price and a "normal" point corresponding to each value-affecting factor, obtaining the information of a "target" artwork to be appraised, and calculating the appraised price of the "target" artwork based on the information of the target artwork and the "normal" price and "normal" points of the same artist's "normal" artwork.

18 Claims, 3 Drawing Sheets

COMPUTER AIDED CALCULATION, APPRAISAL AND VALUATION OF WORKS OF ART

BACKGROUND OF THE INVENTION

1. Field of the Invention

The present invention generally relates to the field of appraisal and valuation of works of arts. More particularly, the present invention relates to the field of computer aided calculation, appraisal and valuation of works of art.

2. Description of the Prior Art

The following prior art references were uncovered in the pertinent art:

1. U.S. Pat. No. 4,191,472 issued to Mason on Mar. 4, 1980 for "Apparatus for the Evaluation of Coins" (hereafter the "Mason Patent").
2. U.S. Pat. No. 4,464,122 issued to Fuller et al. on Aug. 7, 1984 for "Health Potential Summary and Incentive System" (hereafter the "Fuller Patent").
3. U.S. Pat. No. 5,083,270 issued to Gross et al. on Jan. 21, 1992 for "Method and Apparatus for Releasing Value of An Asset" (hereafter the "Gross Patent").
4. U.S. Pat. No. 5,224,176 issued to Crain on Jun. 29, 1993 for "Automated Coin Grading System" (hereafter the "Crain Patent").
5. Japanese Patent No. 59-85,568 for "Information System of Used Car" (hereafter the "Japanese '568 Patent").
6. Japanese Patent No. 59-94,162 for "Electric Calculator for Estimate of Life Insurance" (hereafter the "Japanese '162 Patent").
7. Article "Taking The Risk Out Of Fire Risk Underwriting" published on AIWEEK, Feb. 15, 1989 (hereafter "the AIWEEK Article").

The Mason Patent discloses a method for evaluating coins on an objective basis. First, facsimile coins representing the obverse and reverse sides of a given class of coins are displayed. The facsimile coins are divided into multiple sets, each representing a particular type of coin defect or imperfection. The facsimile coins within a set are arranged according to the increasing or decreasing extent of the coin defect or imperfection. Each facsimile coin is assigned a number representative of the relative value of the coin with such defect or imperfection. To evaluate the value of a real coin, the obverse and reverse sides of the real coin is compared to the facsimile coins. The numeric values of the facsimile coin which exhibits the coin defect or imperfection to the same extent as the real coin are recorded and calculated. The result is used to determine the monetary value of the real coin by referring to a correlation table.

The Fuller Patent discloses a method of evaluating an individual's health. The method utilizes a comprehensive questionnaire. The questionnaire is divided into different categories each having multiple questions to be answered by the individual. The answers are placed in score boxes. The actual condition of the individual is then compared to the ideal condition of each category to provide a health rating of the individual. Finally, the analysis provides an "appraised age" of the individual according to the health rating of the individual.

The Gross Patent discloses a computer aided data processing program. The program is used for recording and updating the value of mortgaged assets.

The Crain Patent discloses an automated coin grading system. The system first utilizes a set of criteria established by professional and expert human graders. The different features of the coins are assigned point scores based on various parameters. These point scores are then used for calculating the subgrades and finally the final grade.

The Japanese '568 Patent discloses a used car information exchange system. The system records seller's data concerning the information of the car for sale as well as buyer's information concerning the desired car. The available for sale and the buyer's demand are then compared and the closest match is sent to the buyer.

The Japanese '162 Patent discloses an apparatus for estimating life insurance premiums. The device will process information such as the length of lives of the insured's family members and calculate the age expectancy of the insured, to determine the life insurance premium.

The AIWEEK Article reported a computer program for fire risk underwriting. The program utilizes a menu-based system that prompts inputs by the user, and then evaluates various fire risk factors in calculating the premium.

It is desirable to have a comprehensive method for computer aided calculation, appraisal and valuation of works of arts.

SUMMARY OF THE INVENTION

The present invention is a method of computer aided calculation, appraisal and valuation of works of art.

There are many factors that affect the price of an artwork. Examples of such factors include medium, size, etc. These factors can be called "value-affecting" factors. Each value-affecting factor affects the price of an artwork to a certain percentage. In different situations such percentages may vary. However, on the average there are certain relatively certain percentages for each factor. For example, compared to oil paintings, watercolors are generally worth one-tenth, and pencils are worth one-twentieth, of the value of oil paintings. Therefore, if oil painting is used as the standard, then watercolors are worth 10%, whereas pencils are worth 5%, of the value of oil paintings. The same is true for size. For example, on the average, the prices of miniature paintings (anything smaller than 6"×7") are 40% that of medium sized paintings (22"×29" to approximately 24"×33" while the prices of large paintings (24"×33" to 40"×50") are 105% of (or 5% more than) that of medium paintings.

Accordingly, the value-affecting factors can be arranged in a structure for appraising artworks. Each factor is associated with several "levels". For example, the 3 "levels" for medium are oil paintings, watercolor and pencil, and the 3 levels for size are large, medium and small. The relative percentages for the respective levels of the factors of medium and size can be arranged as follows:

| Factor 1: Medium | |
|---|---|
| Watercolor | 10% |
| Oil Painting | 100% |
| Pencil | 5% |
| Factor 2: Size | |
| Large | 140% |
| Medium | 100% |
| Small | 75% |

Now, assume that an artist "A" has previously sold two paintings. The data of these two prior sales are as follows:

|  | Painting 1 | Painting 2 |
| --- | --- | --- |
| Price: | $1,000 | $1,200 |
| Medium: | Oil painting | Oil painting |
| Size: | Medium | Medium |

It can be seen that artist A's average price is $1,100. It can also be said that on the average, the paintings of artist A have a "normal" medium which is oil painting, and a "normal" size which is medium. It is conceived by the inventor of the present invention that artist A has an imaginary "normal" artwork which is a medium oil painting worth $1,100. This imaginary "normal" artwork by artist A therefore is associated with a collection of data, including a "normal" price of $1,100, a "normal" medium which is oil painting, and a "normal" size which is medium. This collection of data is called the "NORM" of artist A.

Now suppose that artist A has just finished a third painting which is also an oil painting but is of a large size. The artwork to be appraised is called "TARGET". It is reasonable to predict that the TARGET is worth about $1,540, which is 140% of the "normal" price ($1,100) because of the size factor. This $1,540 is therefore the appraised price of the third painting.

However, if the TARGET is a large mixed medium artwork, then it is reasonable to predict that its value is about $924, which is 140%×60% of the normal price, taking account of both the size and the medium factors.

The process described above is illustrative to the approach of the present invention appraisal method. However, in the real world of artwork appraisal there are many more value-affecting factors, each has many more different levels, and there are many artists each having many more artworks. Accordingly, the present invention utilizes a computer system to handle the appraisal process. The computer system includes a central computer which will maintain a database of all available prior sales data of all known artists. The central computer will also calculate the "NORM" of each artist from the prior sales data, and store the NORM in the database as well. A user who wants to appraise an artwork by a particular artist, i.e., the "TARGET", can contact the operator of the central computer, or connect to the central computer through telecommunication devices, to input the information about the TARGET into the central computer. The central computer will then calculate the appraisal price based on the particular artist's NORM retrieved from the database, and the information of the TARGET provided by the user.

Accordingly, the essential steps of the present invention appraisal method include: (1) providing an appraisal structure of a multiplicity of "value-affecting" factors that affect the price of an artwork, where each factor is further divided into a plurality of levels each assigned a relative percentage rate; (2) establishing a database of all known artworks of all known artists, including each artist's personal information, prior sales information such price and raw data for each value-affecting factor, and individual circumstances that also affect the prices of the artist's artworks; (3) creating an imaginary "Normal" artwork by each artist which has a "normal" price and a "normal" point corresponding to each value-affecting factor; (4) obtaining from a user the information of a "Target" artwork, which is the artwork that needs to be appraised, where the information is arranged according to the value-affecting factors; (5) calculating the predicted price of the "Target" artwork, based on the information of the target artwork and the information of the same artist's "normal" artwork, individual circumstances, and other environmental circumstances; and (6) after an artist's artwork is sold, updating the database for that artist, including re-calculating the "normal" price and other "normal" points of the artist's "normal" artwork.

One critical novel feature of the present invention appraisal method is the concept of the imaginary "normal" artwork by each artist. This imaginary "normal" artwork has a price which is the average of the prices of all the previously sold artworks of the artist. In addition, for each "value-affecting" factor, this imaginary "normal" artwork has a quantified point which is also the average of the quantified points on this factor of all the previously sold artworks of the artist. The collection of the "normal" price and the "normal" points are called "NORM". Each artist in the database has a "NORM", which is the collection of the normal price and points of that artist's imaginary normal artwork.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Figure 1:
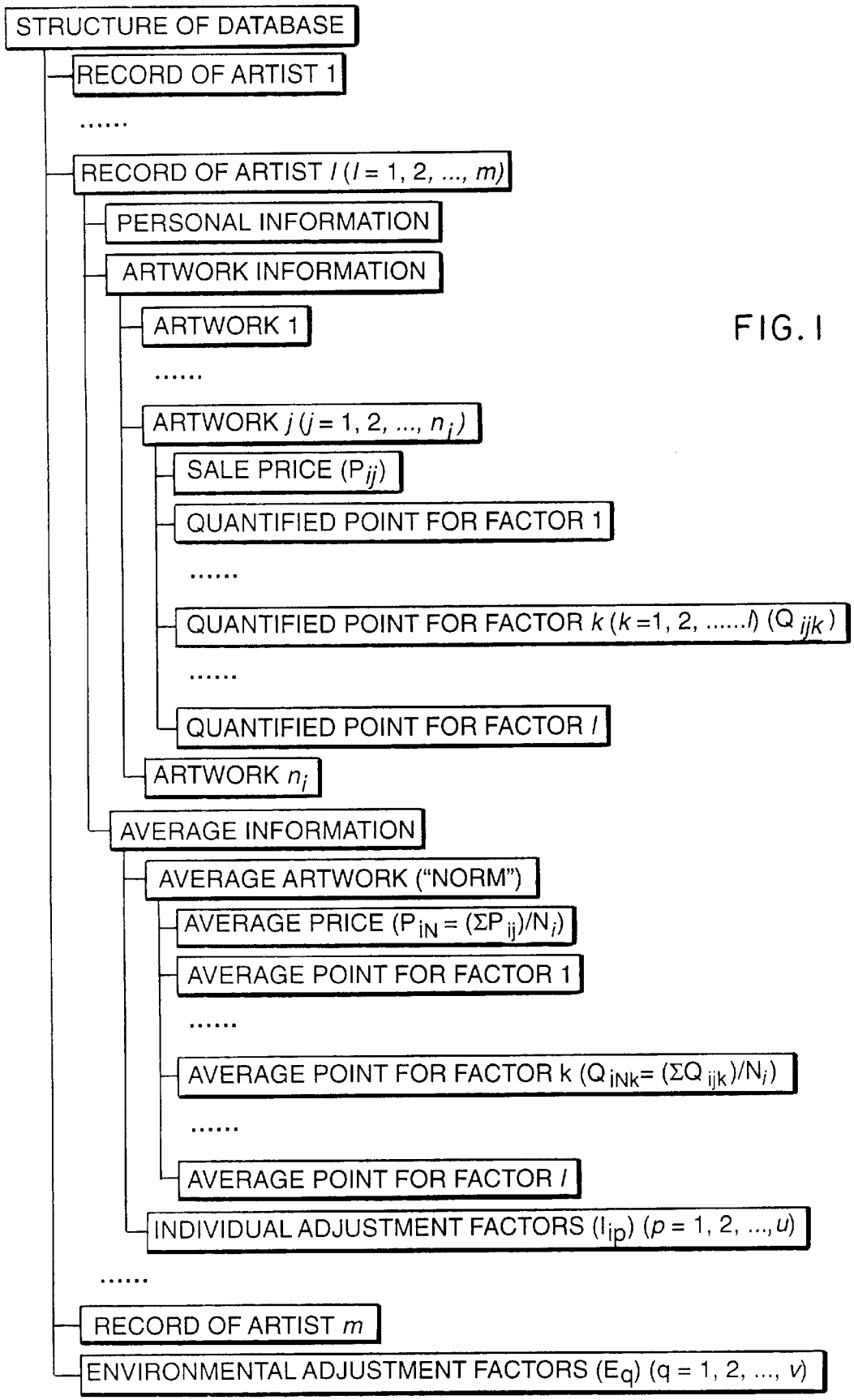
FIG. 1 is an illustration of the structure of the database established and maintained according to the present invention.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

As discussed earlier in the SUMMARY OF THE INVENTION section, there are many factors which affect the price of artworks. TABLE 1.F provides an example of a list of the value-affecting factors. These factors are designated as $F_k$, where k=1,2, . . . ,l (in the example given in TABLE 1.F, l=23).

For each factor $F_k$, there are multiplicity of levels $L_{kr}$, where r=1,2, . . . ,$w_k$. The number of levels $w_k$ may vary from factor to factor. However, in the examples given in this description, for the purpose of simplifying the description, the number of levels for each factor $F_k$ is chosen to be a consistent number w which is 10 (i.e., $w_k$=w=10). Of course any number of levels can be provided to any given factor.

TABLE 1.F

| | Factors | |
| --- | --- | --- |
| k = 1, 2, . . . , l | $F_k$ | Factor |
| 1 | $F_1$ | Medium |
| 2 | $F_2$ | Size |
| 3 | $F_3$ | Identification |
| 4 | $F_4$ | Frame |

TABLE 1.F-continued

Factors

| k = 1, 2, ..., l | $F_k$ | Factor |
|---|---|---|
| 5 | $F_5$ | Condition |
| 6 | $F_6$ | Absolute Quality |
| 7 | $F_7$ | Relative Quality |
| 8 | $F_8$ | Subject Matter |
| 9 | $F_9$ | Style |
| 10 | $F_{10}$ | Decorative Value |
| 11 | $F_{11}$ | Rarity |
| 12 | $F_{12}$ | Relative Period |
| 13 | $F_{13}$ | Age of Artwork |
| 14 | $F_{14}$ | Historic Value |
| 15 | $F_{15}$ | Historic Period |
| 16 | $F_{16}$ | Provenance |
| 17 | $F_{17}$ | Listed Artist |
| 18 | $F_{18}$ | Catalogue Illustration |
| 19 | $F_{19}$ | Prior Expert Appraisal |
| 20 | $F_{20}$ | Art Historians' Consensus |
| 21 | $F_{21}$ | Gallery Owners' Consensus |
| 22 | $F_{22}$ | Location of Artwork |
| ... | ... | ... |

For each level $L_{kr}$, it is assigned a "value-affecting" rate $R_{kr}$. There is always a level, typically level 5 or 6, which is assigned 100% rate. This means that such level is used as the standard for the relative value-affecting rates assigned to other levels. For example, TABLE 1.1 shows the level-rate structure for Factor 1 which is medium. Level 5 ($L_{1,5}$) for oil paintings is assigned a rate of $R_{1,5}$ of 100%. This means the rates for all other mediums are assigned relative to oil paintings. Therefore, since a watercolor is generally worth one-tenth of the price of an oil painting when the status of all other factors are about the same (i.e., "all else being equal"), the rate for watercolors ($R_{1,6}$) is 10%. Similarly, since pencil drawings are generally worth only one-twentieth of the price of oil paintings when "all else being equal", the assigned rate for pencils ($R_{1,2}$) is 5%.

TABLES 1.1 through 1.23 provide examples of the multiplicity of levels set for each factor $F_k$, and the value-affecting rate $R_{kr}$ assigned to each level $L_{kr}$. The present Artindex® invention unearths its starting numerals for calculation: BY ACCURATE AVERAGING OF THE RESULTS OF THE RELEVANT POPULATION'S SCIENTIFIC SURVEY-SAMPLING.

SIMPLY PUT, FOR INSTANCE, IN THE CASE OF WORKS OF ART: IF ONE ART EXPERT THINKS THAT "DECORATIVE VALUE" IS WORTH 3% AND ANOTHER EXPERT THINKS SUCH ATTRIBUTE IS WORTH 1%, THEN THIS INVENTION USES 2% FOR THAT FACTOR'S WIP). These relative percentages $R_{kr}$ are not arbitrarily assigned, but are derived from the careful analysis of the data of prior sales of artworks, and the general consensus of the art appraisal experts, art historians, gallery owners, etc. The general procedure to determine the price-effecting rates $R_{kr}$ for each factor $F_k$ is as follows: (1) designating a level $L_{kN}$ as the base or "normal" level for determining the relative rates of other levels, which normal level $L_{kN}$ is on average the most common situation of all artworks for this factor $F_k$, and assign 100% to this normal level $L_{kN}$; (2) designating a level $L_{kC}$ as the "ceiling" level and a level $L_{kB}$ as the "bottom" level, and further providing other finely divided levels $L_{kr}$ in between.

TABLE 1.1

Factor 1 - Medium

| Level ($L_{1r}$) | Description of Level r (r = 1, 2, ..., w) (w = 10) | Rate ($R_{1r}$) (%) | Quantified Point ($Q_{1r}$) |
|---|---|---|---|
| $L_{1,10}$ | Acrylic | $R_{1,10} = 94$ | $Q_{1,10} = 0.94$ |
| $L_{1,9}$ | Mixed media | $R_{1,9} = 60$ | $Q_{1,9} = 0.60$ |
| $L_{1,8}$ | Pastel | $R_{1,8} = 23$ | $Q_{1,8} = 0.23$ |
| $L_{1,7}$ | Gouache | $R_{1,7} = 14$ | $Q_{1,7} = 0.14$ |
| $L_{1,6}$ | Watercolor, Tempera | $R_{1,6} = 10$ | $Q_{1,6} = 0.10$ |
| $L_{1,5}$ | Oil painting, Collage | $R_{1,5} = 100$ | $Q_{1,5} = 1.00$ |
| $L_{1,4}$ | Ink | $R_{1,4} = 8$ | $Q_{1,4} = 0.08$ |
| $L_{1,3}$ | Charcoal | $R_{1,3} = 7$ | $Q_{1,3} = 0.07$ |
| $L_{1,2}$ | Pencil | $R_{1,2} = 5$ | $Q_{1,2} = 0.05$ |
| $L_{1,1}$ | Other (wax, chalk, etc.) | $R_{1,1} = 4$ | $Q_{1,1} = 0.04$ |

TABLE 1.2

Factor 2 - Size

| Level ($L_{2r}$) | Description of Level r (r = 1, 2, ..., w) (w = 10) | Rate ($R_{2r}$) (%) | Quantified Point ($Q_{2r}$) |
|---|---|---|---|
| $L_{2,10}$ | Giant size (anything larger than 7' × 8') | $R_{2,10} = 55$ | $Q_{2,10} = 0.55$ |
| $L_{2,9}$ | Oversized (52" × 68" to 7' × 8') | $R_{2,9} = 65$ | $Q_{2,9} = 0.65$ |
| $L_{2,8}$ | Extra Large (46" × 56" to 51-⅞" × 67-⅞") | $R_{2,8} = 80$ | $Q_{2,8} = 0.80$ |
| $L_{2,7}$ | Very Large (34" × 46" to 45-⅞" × 55-⅞") | $R_{2,7} = 155$ | $Q_{2,7} = 1.55$ |
| $L_{2,6}$ | Large (24" × 33" to 33-⅞" × 45-⅞") | $R_{2,6} = 140$ | $Q_{2,6} = 1.40$ |
| $L_{2,5}$ | Medium (22" × 29" to 23-⅞" × 32-⅞") | $R_{2,5} = 100$ | $Q_{2,5} = 1.00$ |
| $L_{2,4}$ | Small (16" × 20" to 21-⅞" × 28-⅞") | $R_{2,4} = 75$ | $Q_{2,4} = 0.75$ |
| $L_{2,3}$ | Very Small (7" × 9" to 15-⅞" × 19-⅞") | $R_{2,3} = 55$ | $Q_{2,3} = 0.55$ |
| $L_{2,2}$ | Micro (6" × 7" to 6-⅞" × 8-⅞") | $R_{2,2} = 47$ | $Q_{2,2} = 0.47$ |
| $L_{2,1}$ | Miniature (anything smaller than 6" × 7") | $R_{2,1} = 40$ | $Q_{2,1} = 0.40$ |

TABLE 1.3

Factor 3 - Identification

| Level ($L_{3r}$) | Description of Level r (r = 1, 2, ..., w) (w = 10) | Rate ($R_{3r}$) (%) | Quantified Point ($Q_{3r}$) |
|---|---|---|---|
| $L_{3,10}$ | Signed, dated, and titled by the artist | $R_{3,10} = 150$ | $Q_{3,10} = 1.50$ |
| $L_{3,9}$ | Signed and dated by the artist (front) | $R_{3,9} = 137$ | $Q_{3,9} = 1.37$ |
| $L_{3,8}$ | Signed by the artist (front) | $R_{3,8} = 130$ | $Q_{3,8} = 1.30$ |
| $L_{3,7}$ | Inscribed/Initialed/monogrammed by the artist | $R_{3,7} = 115$ | $Q_{3,7} = 1.15$ |
| $L_{3,6}$ | Any of the above, in the back | $R_{3,6} = 105$ | $Q_{3,6} = 1.05$ |
| $L_{3,5}$ | Authenticated/Attributed by major museum | $R_{3,5} = 100$ | $Q_{3,5} = 1.00$ |
| $L_{3,4}$ | Attributed/Authenticated by major expert | $R_{3,4} = 87$ | $Q_{3,4} = 0.87$ |
| $L_{3,3}$ | Attributed/Authenticated by licensed expert | $R_{3,3} = 60$ | $Q_{3,3} = 0.60$ |
| $L_{3,2}$ | Circle of, or School of, artist | $R_{3,2} = 20$ | $Q_{3,2} = 0.20$ |
| $L_{3,1}$ | No positive identification, attributed by non-recognized entity | $R_{3,1} = 5$ | $Q_{3,1} = 0.05$ |

TABLE 1.4

Factor 4 - Frame

| Level ($L_{4r}$) | Description of Level r (r = 1, 2, ..., w) (w = 10) | Rate ($R_{4r}$) (%) | Quantified Point ($Q_{4r}$) |
|---|---|---|---|
| $L_{4, 10}$ | Perfectly framed in expensive frame | $R_{4, 10} = 106$ | $Q_{4, 10} = 1.06$ |
| $L_{4, 9}$ | Professionally framed in expensive frame | $R_{4, 9} = 105$ | $Q_{4, 9} = 1.05$ |
| $L_{4, 8}$ | Framed in expensive frame | $R_{4, 8} = 104$ | $Q_{4, 8} = 1.04$ |
| $L_{4, 7}$ | Professionally framed | $R_{4, 7} = 103$ | $Q_{47} = 1.03$ |
| $L_{4, 6}$ | Well framed | $R_{4, 6} = 102$ | $Q_{4, 6} = 1.02$ |
| $L_{4, 5}$ | Framed | $R_{4, 5} = 100$ | $Q_{4, 5} = 1.00$ |
| $L_{4, 4}$ | Not framed | $R_{4, 4} = 99$ | $Q_{4, 4} = 0.99$ |
| $L_{4, 3}$ | Must be reframed | $R_{4, 3} = 98$ | $Q_{4, 3} = 0.98$ |
| $L_{4, 2}$ | Must be professionally reframed | $R_{4, 2} = 97$ | $Q_{4, 2} = 0.97$ |
| $L_{4, 1}$ | Must be professionally and costly reframed | $R_{4, 1} = 96$ | $Q_{4, 1} = 0.96$ |

TABLE 1.5

Factor 5 - Condition

| Level ($L_{5r}$) | Description of Level r (r = 1, 2, ..., w) (w = 10) | Rate ($R_{5r}$) (%) | Quantified Point ($Q_{5r}$) |
|---|---|---|---|
| $L_{5, 10}$ | Artwork is in perfect condition | $R_{5, 10} = 127$ | $Q_{5, 10} = 1.27$ |
| $L_{5, 9}$ | Near perfect condition | $R_{5, 9} = 113$ | $Q_{5, 9} = 1.13$ |
| $L_{5, 8}$ | Excellent condition | $R_{5, 8} = 110$ | $Q_{5, 8} = 1.10$ |
| $L_{5, 7}$ | Very good condition | $R_{5, 7} = 105$ | $Q_{5, 7} = 1.05$ |
| $L_{5, 6}$ | Good condition | $R_{5, 6} = 102$ | $Q_{5, 6} = 1.02$ |
| $L_{5, 5}$ | Average condition | $R_{5, 5} = 100$ | $Q_{5, 5} = 1.00$ |
| $L_{5, 4}$ | Artwork has been restored before (evidence of prior restoration) | $R_{5, 4} = 88$ | $Q_{5, 4} = 0.88$ |
| $L_{5, 3}$ | Poor condition, needs a lot of restoration | $R_{5, 3} = 60$ | $Q_{5, 3} = 0.60$ |
| $L_{5, 2}$ | Needs major restoration | $R_{5, 2} = 50$ | $Q_{5, 2} = 0.50$ |
| $L_{5, 1}$ | Restoration may be impossible due to bad condition | $R_{5, 1} = 15$ | $Q_{5, 1} = 0.15$ |

TABLE 1.6

Factor 6 - Absolute World Quality

| Level ($L_{6r}$) | Description of Level r (r = 1, 2, ..., w) (w = 10) | Rate ($R_{6r}$) (%) | Quantified Point ($Q_{6r}$) |
|---|---|---|---|
| $L_{6, 10}$ | Belongs with the greatest masterpieces of Rembrandt, Michelangelo, and Velasquez | $R_{6, 10} = 2,000$ | $Q_{6, 10} = 20.00$ |
| $L_{6, 9}$ | All-time world class masterpiece | $R_{6, 9} = 500$ | $Q_{6, 9} = 5.00$ |
| $L_{6, 8}$ | World class masterpiece | $R_{6, 8} = 300$ | $Q_{6, 8} = 3.00$ |
| $L_{6, 7}$ | Masterpiece | $R_{6, 7} = 200$ | $Q_{6, 7} = 2.00$ |
| $L_{6, 6}$ | Excellent | $R_{6, 6} = 150$ | $Q_{6, 6} = 1.50$ |
| $L_{6, 5}$ | Good | $R_{6, 5} = 100$ | $Q_{6, 5} = 1.00$ |
| $L_{6, 4}$ | Fair | $R_{6, 4} = 50$ | $Q_{6, 4} = 0.50$ |
| $L_{6, 3}$ | Rather poor | $R_{6, 3} = 17$ | $Q_{6, 3} = 0.17$ |
| $L_{6, 2}$ | Poor | $R_{6, 2} = 5$ | $Q_{6, 2} = 0.05$ |
| $L_{6, 1}$ | Bad | $R_{6, 1} = 1$ | $Q_{6, 1} = 0.01$ |

TABLE 1.7

Factor 7 - Relative Quality For This Artist

| Level ($L_{7r}$) | Description of Level r (r = 1, 2, ..., w) (w = 10) | Rate ($R_{7r}$) (%) | Quantified Point ($Q_{7r}$) |
|---|---|---|---|
| $L_{7, 10}$ | Ranks amongst this artist's top 3% of works | $R_{7, 10} = 300$ | $Q_{7, 10} = 3.00$ |
| $L_{7, 9}$ | Ranks amongst this artist's top 10% of works | $R_{7, 9} = 250$ | $Q_{7, 9} = 2.50$ |
| $L_{7, 8}$ | Ranks amongst this artist's top 25% of works | $R_{7, 8} = 200$ | $Q_{7, 8} = 2.00$ |

TABLE 1.7-continued

Factor 7 - Relative Quality For This Artist

| Level ($L_{7r}$) | Description of Level r (r = 1, 2, ..., w) (w = 10) | Rate ($R_{7r}$) (%) | Quantified Point ($Q_{7r}$) |
|---|---|---|---|
| $L_{7, 7}$ | Ranks amongst this artist's better works | $R_{7, 7} = 150$ | $Q_{7, 7} = 1.50$ |
| $L_{7, 6}$ | Better than this artist's average work | $R_{7, 6} = 120$ | $Q_{7, 6} = 1.20$ |
| $L_{7, 5}$ | Average quality for this artist | $R_{7, 5} = 100$ | $Q_{7, 5} = 1.00$ |
| $L_{7, 4}$ | Less than average quality for this artist | $R_{7, 4} = 80$ | $Q_{7, 4} = 0.80$ |
| $L_{7, 3}$ | One of this artist's weaker works | $R_{7, 3} = 65$ | $Q_{7, 3} = 0.65$ |
| $L_{7, 2}$ | Poor example of this artist's quality of work | $R_{7, 2} = 40$ | $Q_{7, 2} = 0.40$ |
| $L_{7, 1}$ | One of the poorest examples for the artist's work | $R_{7, 1} = 15$ | $Q_{7, 1} = 0.15$ |

TABLE 1.8

Factor 8 - Subject Matter

| Level ($L_{8r}$) | Description of Level r (r = 1, 2, ..., w) (w = 10) | Rate ($R_{8r}$) (%) | Quantified Point ($Q_{8r}$) |
|---|---|---|---|
| $L_{8, 10}$ | Cubist Composition, Venice | $R_{8, 10} = 150$ | $Q_{8, 10} = 1.50$ |
| $L_{8, 9}$ | Abstract Composition, London, Nude | $R_{8, 9} = 140$ | $Q_{8, 9} = 1.40$ |
| $L_{8, 8}$ | Landscape, Rome, Storm, Seascape, Sail Boats, Portrait of very important historical figures, or very famous individuals | $R_{8, 8} = 130$ | $Q_{8, 8} = 1.30$ |
| $L_{8, 7}$ | Hunting Scene, Horses, Interior, Lake, Winter, Summer, Still life of books, flowers or fruit, Autumn, Space, River, Ocean, Brook, Clouds, Sunset, Sky, Moon, Beach | $R_{8, 7} = 120$ | $Q_{8, 7} = 1.20$ |
| $L_{8, 6}$ | Abstract, Composition, City scape, Expressionist, Still life other than books, flowers or fruit, Spring, Mountains, See battle, Portrait of a young pretty woman | $R_{8, 6} = 110$ | $Q_{8, 6} = 1.10$ |
| $L_{8, 5}$ | Cattle grazing, Fishermen, Forest, Harvest, Sex, Ocean ships, Jesus on the Cross | $R_{8, 5} = 100$ | $Q_{8, 5} = 1.00$ |
| $L_{8, 4}$ | Dogs, Cats, Tavern scene, Peasants, Portrait of a not pretty woman, Cars, Boats, Airplanes | $R_{8, 4} = 95$ | $Q_{8, 4} = 0.95$ |
| $L_{8, 3}$ | Animals, Battle scene, Cattle, Warrior, Portrait of children | $R_{8, 3} = 90$ | $Q_{8, 3} = 0.90$ |
| $L_{8, 2}$ | Couple, Portrait of unknown people | $R_{8, 2} = 80$ | $Q_{8, 2} = 0.80$ |
| $L_{8, 1}$ | Portrait of men, Other religious, Unlisted | $R_{8, 1} = 75$ | $Q_{8, 1} = 0.75$ |

TABLE 1.9

Factor 9 - Style

| Level ($L_{9r}$) | Description of Level r (r = 1, 2, ..., w) (w = 10) | Rate ($R_{9r}$) (%) | Quantified Point ($Q_{9r}$) |
|---|---|---|---|
| $L_{9, 10}$ | Impressionist, Cubist | $R_{9, 10} = 120$ | $Q_{9, 10} = 1.20$ |
| $L_{9, 9}$ | Constructivist, Classicist, Renaissance | $R_{9, 9} = = 115$ | $Q_{9, 9} = 1.15$ |
| $L_{9, 8}$ | Romanticist, Representationist, Modernist, Free-Expressionist | $R_{9, 8} = 110$ | $Q_{9, 8} = 1.10$ |
| $L_{9, 7}$ | Realist, Pointillist, Non-Representationist, Naturalist | $R_{9, 7} = 105$ | $Q_{9, 7} = 1.05$ |
| $L_{9, 6}$ | Symbolist, Objectivist, Neotraditionist, Futurist, Existentialist, Abstractionist, Abstract Classicist | $R_{9, 6} = 102$ | $Q_{9, 6} = 1.02$ |
| $L_{9, 5}$ | Traditionalist, Surrealist, Post-Impressionalist, Neocubist, Neoclassicist, Lyrical Abstractionist, Linear Chromatist, | $R_{9, 5} = 100$ | $Q_{9, 5} = 1.00$ |

TABLE 1.9-continued

Factor 9 - Style

| Level ($L_{9r}$) | Description of Level r (r = 1, 2, ..., w) (w = 10) | Rate ($R_{9r}$) (%) | Quantified Point ($Q_{9r}$) |
|---|---|---|---|
| | Informalist, Fauvist, Elementalist, Concretist, Baroque Formalist | | |
| $L_{9,4}$ | Synchromist, Purist, Primitivist, Pre-Impressionalist, Post-expressionalist, Plain Airist, Neoexpressionist, Matter Imformalist, Kineticist, Geometricist, Conventionalist, Conceptualist, Analytical Cubist, Abstract Expressionalist | $R_{9,4} = 90$ | $Q_{9,4} = 0.90$ |
| $L_{9,3}$ | Socialist Realist, Supremeatist, Poetis Realist, Nonobjectivist, Neoplasticist, Neodadaist, Mysticist, Mannerist, Magic Realist, Luminist, Eclecticist, Dadaist | $R_{9,3} = 87$ | $Q_{9,3} = 0.87$ |
| $L_{9,2}$ | Synthesist, Surrealist-tachist, Spatialist, Postconcretist, Poptical Artist, Op Artist, Nuagist, Neoconstructivist, Luminodynamist, Activist | $R_{9,2} = 84$ | $Q_{9,2} = 0.84$ |
| $L_{9,1}$ | Tachist, Unist, Superrationali Automatist, Poetic Tachist, Pop Artist, Monaction Calligraphist, Intimist, Gesturist, Earth Artist, Divisionist, Attitudist, Action Painter | $R_{9,1} = 80$ | $Q_{9,1} = 0.80$ |

TABLE 1.10

Factor 10 - Decorative Value

| Level ($L_{10r}$) | Description of Level r (r = 1, 2, ..., w) (w = 10) | Rate ($R_{10r}$) (%) | Quantified Point ($Q_{10r}$) |
|---|---|---|---|
| $L_{10,10}$ | Ideally decorative | $R_{10,10} = 135$ | $Q_{10,10} = 1.35$ |
| $L_{10,9}$ | Greatly decorative | $R_{10,9} = 127$ | $Q_{10,9} = 1.27$ |
| $L_{10,8}$ | Very decorative | $R_{10,8} = 121$ | $Q_{10,8} = 1.21$ |
| $L_{10,7}$ | Much more than decorative | $R_{10,7} = 115$ | $Q_{10,7} = 1.15$ |
| $L_{10,6}$ | More than decorative | $R_{10,6} = 107$ | $Q_{10,6} = 1.07$ |
| $L_{10,5}$ | Somewhat decorative | $R_{10,5} = 100$ | $Q_{10,5} = 1.00$ |
| $L_{10,4}$ | Decorative | $R_{10,4} = 82$ | $Q_{10,4} = 0.82$ |
| $L_{10,3}$ | Has little decorative value | $R_{10,3} = 79$ | $Q_{10,3} = 0.79$ |
| $L_{10,2}$ | Has very little decorative value | $R_{10,2} = 60$ | $Q_{10,2} = 0.60$ |
| $L_{10,1}$ | Has no decorative value | $R_{10,1} = 30$ | $Q_{10,1} = 0.30$ |

TABLE 1.11

Factor 11 - Rarity Factor

| Level ($L_{11r}$) | Description of Level r (r = 1, 2, ..., w) (w = 10) | Rate ($R_{11r}$) (%) | Quantified Point ($Q_{11r}$) |
|---|---|---|---|
| $L_{11,10}$ | Extremely rare | $R_{11,10} = 150$ | $Q_{11,10} = 1.50$ |
| $L_{11,9}$ | Very rare | $R_{11,9} = 135$ | $Q_{11,9} = 1.35$ |
| $L_{11,8}$ | Quite rare | $R_{11,8} = 120$ | $Q_{11,8} = 1.20$ |
| $L_{11,7}$ | Rare | $R_{11,7} = 112$ | $Q_{11,7} = 1.12$ |
| $L_{11,6}$ | Somewhat rare | $R_{11,6} = 107$ | $Q_{11,6} = 1.07$ |
| $L_{11,5}$ | Average | $R_{11,5} = 100$ | $Q_{11,5} = 1.00$ |
| $L_{11,4}$ | Quite common | $R_{11,4} = 85$ | $Q_{11,4} = 0.85$ |
| $L_{11,3}$ | Very common | $R_{11,3} = 80$ | $Q_{11,3} = 0.80$ |
| $L_{11,2}$ | Extremely common | $R_{11,2} = 62$ | $Q_{11,2} = 0.62$ |
| $L_{11,1}$ | Market flooded | $R_{11,1} = 10$ | $Q_{11,1} = 0.10$ |

TABLE 1.12

Factor 12 - Relative Period

| Level ($L_{12r}$) | Description of Level r (r = 1, 2, ..., w) (w = 10) | Rate ($R_{12r}$) (%) | Quantified Point ($Q_{12r}$) |
|---|---|---|---|
| $L_{12,10}$ | This artist's finest period | $R_{12,10} = 250$ | $Q_{12,10} = 2.50$ |
| $L_{12,9}$ | Excellent period | $R_{12,9} = 200$ | $Q_{12,9} = 2.00$ |
| $L_{12,8}$ | Very good period | $R_{12,8} = 150$ | $Q_{12,8} = 1.50$ |
| $L_{12,7}$ | Good period | $R_{12,7} = 130$ | $Q_{12,7} = 1.30$ |
| $L_{12,6}$ | Better than normal period | $R_{12,6} = 120$ | $Q_{12,6} = 1.20$ |
| $L_{12,5}$ | Normal period | $R_{12,5} = 100$ | $Q_{12,5} = 1.00$ |
| $L_{12,4}$ | Weaker than normal period | $R_{12,4} = 80$ | $Q_{12,4} = 0.80$ |
| $L_{12,3}$ | Weak period | $R_{12,3} = 75$ | $Q_{12,3} = 0.75$ |
| $L_{12,2}$ | Vety weak period | $R_{12,2} = 50$ | $Q_{12,2} = 0.50$ |
| $L_{12,1}$ | This artist's weakest period (possibly very early or very late work) | $R_{12,1} = 20$ | $Q_{12,1} = 0.20$ |

TABLE 1.13

Factor 13 - Age of Artwork

| Level ($L_{13r}$) | Description of Level r (r = 1, 2, ..., w) (w = 10) | Rate ($R_{13r}$) (%) | Quantified Point ($Q_{13r}$) |
|---|---|---|---|
| $L_{13,10}$ | More than 500 years | $R_{13,10} = 150$ | $Q_{13,10} = 1.50$ |
| $L_{13,9}$ | 400–499 years | $R_{13,9} = 130$ | $Q_{13,9} = 1.30$ |
| $L_{13,8}$ | 300–399 years | $R_{13,8} = 120$ | $Q_{13,8} = 1.20$ |
| $L_{13,7}$ | 200–299 years | $R_{13,7} = 115$ | $Q_{13,7} = 1.15$ |
| $L_{13,6}$ | 100–199 years | $R_{13,6} = 110$ | $Q_{13,6} = 1.10$ |
| $L_{13,5}$ | 50–99 years | $R_{13,5} = 100$ | $Q_{13,5} = 1.00$ |
| $L_{13,4}$ | 25–49 years | $R_{13,4} = 98$ | $Q_{13,4} = 0.98$ |
| $L_{13,3}$ | 10–24 years | $R_{13,3} = 95$ | $Q_{13,3} = 0.95$ |
| $L_{13,2}$ | 1–10 years | $R_{13,2} = 92$ | $Q_{13,2} = 0.92$ |
| $L_{13,1}$ | Less than 1 year | $R_{13,1} = 90$ | $Q_{13,1} = 0.90$ |

TABLE 1.14

Factor 14 - Historic Value

| Level ($L_{14r}$) | Description Level r (r = 1,2, ..., w) (w = 10) | Rate ($R_{14r}$) (%) | Quantified Point ($Q_{14r}$) |
|---|---|---|---|
| $L_{14,10}$ | Artwork has extremely great historic value | $R_{14,10} = 148$ | $Q_{14,10} = 1.48$ |
| $L_{14,9}$ | Artwork has great historic value | $R_{14,9} = 127$ | $Q_{14,9} = 1.27$ |
| $L_{14,8}$ | Artwork has very important and unique historic value | $R_{14,8} = 120$ | $Q_{14,8} = 1.20$ |
| $L_{14,7}$ | Artwork has important historic value | $R_{14,7} = 115$ | $Q_{14,7} = 1.15$ |
| $L_{14,6}$ | Artwork has some historic value | $R_{14,6} = 110$ | $Q_{14,6} = 1.10$ |
| $L_{14,5}$ | Artwork has average historic value | $R_{14,5} = 100$ | $Q_{14,5} = 1.00$ |
| $L_{14,4}$ | Artwork has less than average historic value | $R_{14,4} = 98$ | $Q_{14,4} = 0.98$ |
| $L_{14,3}$ | Artwork has little historic value | $R_{14,3} = 95$ | $Q_{14,3} = 0.95$ |
| $L_{14,2}$ | Artwork has very little, if any, historic value | $R_{14,2} = 93$ | $Q_{14,2} = 0.93$ |
| $L_{14,1}$ | Artwork has no historic value at all | $R_{14,1} = 91$ | $Q_{14,1} = 0.91$ |

TABLE 1.15

Factor 15 - Historic Period

| Level ($L_{15r}$) | Description of Level r (r = 1, 2, ..., w) (w = 10) | Rate ($R_{15r}$) (%) | Quantified Point ($Q_{15r}$) |
|---|---|---|---|
| $L_{15,10}$ | Renaissance | $R_{15,10} = 150$ | $Q_{15,10} = 1.50$ |
| $L_{15,9}$ | Cubist | $R_{15,9} = 125$ | $Q_{15,9} = 1.25$ |
| $L_{15,8}$ | Impressionist | $R_{15,8} = 120$ | $Q_{15,8} = 1.20$ |
| $L_{15,7}$ | New York School, classical | $R_{15,7} = 110$ | $Q_{15,7} = 1.10$ |
| $L_{15,6}$ | An importance historic period | $R_{15,6} = 108$ | $Q_{15,6} = 1.08$ |
| $L_{15,5}$ | Average | $R_{15,5} = 100$ | $Q_{15,5} = 1.00$ |
| $L_{15,4}$ | Less than average | $R_{15,4} = 98$ | $Q_{15,4} = 0.98$ |
| $L_{15,3}$ | Uncertain historic period | $R_{15,3} = 97$ | $Q_{15,3} = 0.97$ |
| $L_{15,2}$ | Probably of no historic period | $R_{15,2} = 96$ | $Q_{15,2} = 0.96$ |
| $L_{15,1}$ | No identifiable historic period | $R_{15,1} = 95$ | $Q_{15,1} = 0.95$ |

TABLE 1.16

Factor 16 - Provenance

| Level ($L_{16r}$) | Description of Level r (r = 1, 2, ..., w) (w = 10) | Rate ($R_{16r}$) (%) | Quantified Point ($Q_{16r}$) |
|---|---|---|---|
| $L_{16,10}$ | Previously owned by top 100 museums | $R_{16,10} = 300$ | $Q_{16,10} = 3.00$ |
| $L_{16,9}$ | Previously owned by a national museum | $R_{16,9} = 150$ | $Q_{16,9} = 1.50$ |
| $L_{16,8}$ | Previously owned by a regional museum | $R_{16,8} = 125$ | $Q_{16,8} = 1.25$ |
| $L_{16,7}$ | Previously owned by a prominent collector or gallery | $R_{16,7} = 120$ | $Q_{16,7} = 1.20$ |
| $L_{16,6}$ | Written authentication by a major expert | $R_{16,6} = 112$ | $Q_{16,6} = 1.12$ |
| $L_{16,5}$ | Written authentication by a licensed expert | $R_{16,5} = 100$ | $Q_{16,5} = 1.00$ |
| $L_{16,4}$ | Written provenance from an important gallery | $R_{16,4} = 99$ | $Q_{16,4} = 0.99$ |
| $L_{16,3}$ | Written provenance from a gallery | $R_{16,3} = 97$ | $Q_{16,3} = 0.97$ |
| $L_{16,2}$ | Written provenance from an unrecognized entity | $R_{16,2} = 89$ | $Q_{16,2} = 0.89$ |
| $L_{16,1}$ | No written provenance | $R_{16,1} = 85$ | $Q_{16,1} = 0.85$ |

TABLE 1.17

Factor 17 - Listed Artist

| Level ($L_{17r}$) | Description of Level r (r = 1, 2, ..., w) (w = 10) | Rate ($R_{17r}$) (%) | Quantified Point ($Q_{17r}$) |
|---|---|---|---|
| $L_{17,10}$ | Prominently listed in all international encyclopedias | $R_{17,10} = 150$ | $Q_{17,10} = 1.50$ |
| $L_{17,9}$ | Listed in all international encyclopedias | $R_{17,9} = 129$ | $Q_{17,9} = 1.29$ |
| $L_{17,8}$ | Listed in at least four international encyclopedias | $R_{17,8} = 119$ | $Q_{17,8} = 1.19$ |
| $L_{17,7}$ | Listed in at least three international encyclopedias | $R_{17,7} = 115$ | $Q_{17,7} = 1.15$ |
| $L_{17,6}$ | Listed in at least two international encyclopedias | $R_{17,6} = 113$ | $Q_{17,6} = 1.13$ |
| $L_{17,5}$ | Listed in some encyclopedias | $R_{17,5} = 100$ | $Q_{17,5} = 1.00$ |
| $L_{17,4}$ | Listed in international publications | $R_{17,4} = 90$ | $Q_{17,4} = 0.90$ |
| $L_{17,3}$ | Listed in national publications | $R_{17,3} = 84$ | $Q_{17,3} = 0.84$ |
| $L_{17,2}$ | Listed in regional publications | $R_{17,2} = 80$ | $Q_{17,2} = 0.80$ |
| $L_{17,1}$ | Listed in some publications | $R_{17,1} = 70$ | $Q_{17,1} = 0.70$ |

TABLE 1.18

Factor 18 - Catalogue Illustration

| Level ($L_{18r}$) | Description of Level r (r = 1, 2, ..., w) (w = 10) | Rate ($R_{18r}$) (%) | Quantified Point ($Q_{18r}$) |
|---|---|---|---|
| $L_{18,10}$ | On cover of a top 100 museum catalogue | $R_{18,10} = 200$ | $Q_{18,10} = 2.00$ |
| $L_{18,9}$ | Listed in a top 100 museum catalogue | $R_{18,9} = 175$ | $Q_{18,9} = 1.75$ |
| $L_{18,8}$ | Listed in a major museum catalogue | $R_{18,8} = 150$ | $Q_{18,8} = 1.50$ |
| $L_{18,7}$ | Listed in a museum catalogue | $R_{18,7} = 120$ | $Q_{18,7} = 1.20$ |
| $L_{18,6}$ | Listed in a major published catalogue | $R_{18,6} = 115$ | $Q_{18,6} = 1.15$ |
| $L_{18,5}$ | Listed in an independently published catalogue | $R_{18,5} = 100$ | $Q_{18,5} = 1.00$ |
| $L_{18,4}$ | Listed in more than one privately published catalogue | $R_{18,4} = 90$ | $Q_{18,4} = 0.90$ |
| $L_{18,3}$ | Listed in a self-published major catalogue | $R_{18,3} = 89$ | $Q_{18,3} = 0.89$ |
| $L_{18,2}$ | Listed in a self-published catalogue | $R_{18,2} = 82$ | $Q_{18,2} = 0.82$ |
| $L_{18,1}$ | Not listed in any catalogue | $R_{18,1} = 70$ | $Q_{18,1} = 0.70$ |

TABLE 1.19

Factor 19 - Prior Expert Written Appraisal

| Level ($L_{19r}$) | Description of Level r (r = 1, 2, ..., w) (w = 10) | Rate ($R_{19r}$) (%) | Quantified Point ($Q_{19r}$) |
|---|---|---|---|
| $L_{19,10}$ | Top 100 museum appraised | $R_{19,10} = 140$ | $Q_{19,10} = 1.40$ |
| $L_{19,9}$ | Museum appraised | $R_{19,9} = 115$ | $Q_{19,9} = 1.15$ |
| $L_{19,8}$ | Major internationally recognized independent expert appraised | $R_{19,8} = 110$ | $Q_{19,8} = 1.10$ |
| $L_{19,7}$ | Major internationally auction house appraised | $R_{19,7} = 105$ | $Q_{19,7} = 1.05$ |
| $L_{19,6}$ | Major internationally gallery appraised | $R_{19,6} = 102$ | $Q_{19,6} = 1.02$ |
| $L_{19,5}$ | Licensed private independent appraiser appraised | $R_{19,5} = 100$ | $Q_{19,5} = 1.00$ |
| $L_{19,4}$ | National appraiser appraised | $R_{19,4} = 99$ | $Q_{19,4} = 0.99$ |
| $L_{19,3}$ | Gailery appraised | $R_{19,3} = 98$ | $Q_{19,3} = 0.98$ |
| $L_{19,2}$ | Written appraisal | $R_{19,2} = 90$ | $Q_{19,2} = 0.90$ |
| $L_{19,1}$ | No written appraisal | $R_{19,1} = 82$ | $Q_{19,1} = 0.82$ |

TABLE 1.20

Factor 20 - Art Historians' Consensus

| Level ($L_{20r}$) | Description of Level r (r = 1, 2, ..., w) (w = 10) | Rate ($R_{20r}$) (%) | Quantified Point ($Q_{20r}$) |
|---|---|---|---|
| $L_{20,10}$ | More than four major art historians are enthusiastic about this artwork | $R_{20,10} = 116$ | $Q_{20,10} = 1.16$ |
| $L_{20,9}$ | At least two major art historians are enthusiastic about this artwork | $R_{20,9} = 113$ | $Q_{20,9} = 1.13$ |
| $L_{20,8}$ | General positive expressions in academic | $R_{20,8} = 111$ | $Q_{20,8} = 1.11$ |
| $L_{20,7}$ | More than one art historian expressed admiration | $R_{20,7} = 109$ | $Q_{20,7} = 1.09$ |
| $L_{20,6}$ | At least one art historian expressed admiration | $R_{20,6} = 105$ | $Q_{20,6} = 1.05$ |
| $L_{20,5}$ | No art historian's opinion available | $R_{20,5} = 100$ | $Q_{20,5} = 1.00$ |
| $L_{20,4}$ | Some controversy about this art work | $R_{20,4} = 90$ | $Q_{20,4} = 0.90$ |
| $L_{20,3}$ | Some doubts expressed by more than one art historian | $R_{20,3} = 85$ | $Q_{20,3} = 0.85$ |
| $L_{20,2}$ | Conflicting opinions in academic circle | $R_{20,2} = 65$ | $Q_{20,2} = 0.65$ |
| $L_{20,1}$ | More than one art historians said the art work was a fake | $R_{20,1} = 40$ | $Q_{20,1} = 0.40$ |

TABLE 1.21

Factor 21 - Gallery Owners' Consensus

| Level ($R_{21r}$) | Description of Level r (r = 1, 2, . . ., w) (w = 10) | Rate ($R_{21r}$) (%) | Quantified Point ($Q_{21r}$) |
|---|---|---|---|
| $L_{21,10}$ | More than four major galleries owned this art work in the past | $R_{21,10} = 110$ | $Q_{21,10} = 1.10$ |
| $L_{21,9}$ | More than three major galleries owned this art work in the past | $R_{21,9} = 106$ | $Q_{21,9} = 1.06$ |
| $L_{21,8}$ | More than one major galleries owned this art work in the past | $R_{21,8} = 104$ | $Q_{21,8} = 1.04$ |
| $L_{21,7}$ | More than two galleries expressed enthusiasm about this art work | $R_{21,7} = 103$ | $Q_{21,7} = 1.03$ |
| $L_{21,6}$ | More than one galleries expressed enthusiasm about this art work | $R_{21,6} = 102$ | $Q_{21,6} = 1.02$ |
| $L_{21,5}$ | No gallery owner's opinion available | $R_{21,5} = 100$ | $Q_{21,5} = 1.00$ |
| $L_{21,4}$ | At least two gallery owners expressed doubt about this art work | $R_{21,4} = 90$ | $Q_{21,4} = 0.90$ |
| $L_{21,3}$ | At least four gallery owners expressed doubt about this art work | $R_{21,3} = 80$ | $Q_{21,3} = 0.80$ |
| $L_{21,2}$ | Many gallery owners think lowly about this art work | $R_{21,2} = 70$ | $Q_{21,2} = 0.70$ |
| $L_{21,1}$ | A generally depreciated work | $R_{21,1} = 40$ | $Q_{21,1} = 0.40$ |

TABLE 1.22

Factor 22 - Location of Artwork

| Level ($L_{22r}$) | Description of Level r (r = 1, 2, . . ., w) (w = 10) | Rate ($R_{22r}$) (%) | Quantified Point ($Q_{22r}$) |
|---|---|---|---|
| $L_{22,10}$ | New York City | $R_{22,10} = 120$ | $Q_{22,10} = 1.20$ |
| $L_{22,9}$ | Paris, London, Rome | $R_{22,9} = 105$ | $Q_{22,9} = 1.05$ |
| $L_{22,8}$ | Munich, Vienna, Oslo | $R_{22,8} = 104$ | $Q_{22,8} = 1.04$ |
| $L_{22,7}$ | San Francisco | $R_{22,7} = 103$ | $Q_{22,7} = 1.03$ |
| $L_{22,6}$ | Los Angeles | $R_{22,6} = 102$ | $Q_{22,6} = 1.02$ |
| $L_{22,5}$ | Prague, Stockholm, Copenhagen, Budapest | $R_{22,5} = 100$ | $Q_{22,5} = 1.00$ |
| $L_{22,4}$ | Bucharest, Vladivostok, Sofia | $R_{22,4} = 89$ | $Q_{22,4} = 0.89$ |
| $L_{22,3}$ | Buenos Aires, Caracas | $R_{22,3} = 87$ | $Q_{22,3} = 0.87$ |
| $L_{22,2}$ | Zagrab, Pretoria, Havana | $R_{22,2} = 60$ | $Q_{22,2} = 0.60$ |
| $L_{22,1}$ | Sarjevo, Rapa Nui, other unlisted cities | $R_{22,1} = 20$ | $Q_{22,1} = 0.20$ |

It can be seen that the "ceiling" rate $R_{kC}$ for the ceiling level $L_{kC}$ is not necessarily the highest rate. For example, for the size factor $F_2$, the ceiling level is the largest or "giant" paintings, but the rate $R_{2,2}$ is not the highest, which simply reflect that in the real world it is not the bigger the better. On the other hand, the "bottom" rate $R_{kB}$ is usually the lowest rate. This is because the bottom level $L_{kB}$ is usually the worst case situation. However, the rate $R_{kB}$ for the bottom level $L_{kB}$ must be greater or equal to zero ($L_{kB} \geq 0$). This is because in the worst situation the artwork is worth nothing, but it can never have a negative value.

The "quantified points" $Q_{kr}$ listed in TABLES 1.1 through 1.23 are not part of the factor-level-rate structure. They will be described in subsequent paragraphs.

The above described procedure is the first basic step of the present invention appraisal method. In summary, the first step is to provide an appraisal structure of a multiplicity of value-affecting factors $F_k$ (k=1,2, . . . l), where each factor $F_k$ is further provided a multiplicity of levels $L_{kr}$ (r=1,2, . . . ,$w_k$), and each level $L_{kr}$ is assigned a value-affecting percentage rate $R_{kr}$.

The next basic step of the present invention appraisal method is to establish a data base. This step includes two procedures: (1) for each known artist, collect raw data of all of the artists' prior sales of artworks; (2) for each artwork of a particular artist, convert the raw data for all value-affecting factors into a set of "quantified points".

The structure of the database is shown in FIG. 1. The database stores records of all known artists. For a particular artist $A_i$ (i=1,2, . . . ,m) (where m is the total number of records in the database), his or her record includes the following information: (1) personal information, such as name, birth date, nationality, etc.; and (2) artwork information, i.e., artist $A_i$'s all prior sales data. Artist $A_i$'s record also include "average" information which is derived in the next step and also stored in the database.

TABLE 2 is an illustration of the organization of the information on artist $A_i$. Assume the total number of artist $A_i$'s previously sold artwork is $n_i$. The raw data for artist $A_i$'s each previously sold artwork $W_j$ (j=1,2, . . . $n_i$) include the sale price $P_{ij}$, and the actual raw data $D_{ijk}$ for each value-affecting factor $F_k$. The raw data $D_{ijk}$ for each factor $F_k$ will fall in one of the multiplicity of levels $L_{kr}$ provided to that factor $F_k$, which level $L_{kr}$ is further provided with a value-affecting rate $R_{kr}$.

Using the same example as in the SUMMARY OF THE INVENTION section, suppose that the raw data of artist A's three (3) previously sold artworks are as follows:

| Name: A | Painting 1 | Painting 2 | Painting 3 |
|---|---|---|---|
| Price: | $1,000 | $1,200 | $920 |
| Medium: | Oil painting | Oil painting | Mixed medium |
| Size: | 22" × 30" | 22" × 32" | 24" × 36" |

These raw data can be arranged, for example, as shown in TABLE 2.A.

TABLE 2

Artist i

PERSONAL INFORMATION
  Name
  Date of Birth
  Nationality
  . . .

ARTWORK INFORMATION (total number of artworks = $n_i$)
  . . .
  Artwork j
    Price      $P_{ij}(\$)$
    Factor   Raw Data (D)   Level(L)   Rate(R)   Point(Q)
    . . .       . . .          . . .      . . .     . . .
    k          $D_{ijk}$      $L_{kr}$   $R_{kr}(\%)$  $Q_{ijk}$
    . . .       . . .          . . .      . . .     . . .

AVERAGE ARTWORK ("NORM") INFORMATION
  Ave. Price   $P_{iN}(\$)$
  Factor                                          Ave. Q.
                                                  Pt.($Q_{iN}$)
  . . .                                           . . .
  k                                               $Q_{iNk}$
  . . .                                           . . .

INDIVIDUAL CIRCUMSTANCES INFORMATION
  Circumstance                                    Adj.(±%)
  Circumstances number p . . .                    $I_{ip}(\%)$
  . . .                                           . . .

TABLE 2.A

Artist A

PERSONAL INFORMATION
  Name A
  . . .

ARTWORK INFORMATION      Level         Rate(%)         Q Point
(n = 3)
  Artwork #1  Price $P_{i1}$ = $1,000.00
    Medium  Oil painting   $L_{1,5}$ = 5   $R_{1,5}$ = 100%   $Q_{i11}$ = 1.00
    Size    22" × 30"      $L_{2,5}$ = 5   $R_{2,5}$ = 100%   $Q_{i12}$ = 1.00
    . . .
  Artwork #2  Price $P_{i2}$ = $1,200.00
    Medium  Oil painting   $L_{1,5}$ = 5   $R_{1,5}$ = 100%   $Q_{i21}$ = 1.00
    Size    22" × 32"      $L_{2,5}$ = 5   $R_{2,5}$ = 100%   $Q_{i22}$ = 1.00
    . . .
  Artwork #3  Price $P_{i3}$ = $920.00
    Medium  Mixed medium   $L_{1,6}$ = 6   $R_{1,6}$ = 60%    $Q_{i31}$ = 0.60
    Size    24" × 36"      $L_{3,6}$ = 6   $R_{2,6}$ = 140%   $Q_{i32}$ = 1.40
    . . .

AVERAGE ARTWORK ("NORM") INFORMATION
  Ave.    $P_{iN}$ = $1,040.00
  Price
  Medium                                          $Q_{iN1}$ = 0.87
  Size                                            $Q_{iN2}$ = 1.13
  . . .

INDIVIDUAL CIRCUMSTANCES INFORMATION
  Circumstance                                    $I_{ip}(\%)$
                                                  +2%

As seen in TABLE 2.i, once the raw data for each factor $F_k$ is known, the corresponding level $L_{kr}$ and $R_{kr}$ are determined. For example, for the first artwork (j=1), the raw data for the first, i.e., medium, factor $F_1$ (k=1) is "Oil painting". This falls into level 5 ($L_{kr}=L_{1,5}$) for such factor and the associated rate ($R_{kr}=R_{1,5}$) is 100%.

The raw data itself or the corresponding rates for the raw data can be directly stored in the database. However, it is preferable to store the "quantified points" Q, which is simply calculated from the value-affecting rate R:

$$Q=R/100 \qquad [1]$$

Accordingly, the raw data of each artwork $W_{ij}$ by artist A are converted into the following quantified points $Q_{ijk}$ for each factor $F_k$:

|         | Painting 1        | Painting 2        | Painting 3        |
|---------|-------------------|-------------------|-------------------|
| Price:  | $1,000            | $1,200            | $920              |
| Medium: | $Q_{i,1,1}$ = 1.00 | $Q_{i,2,1}$ = 1.00 | $Q_{i,3,1}$ = 0.60 |
| Size:   | $Q_{i,1,2}$ = 1.00 | $Q_{i,2,2}$ = 1.00 | $Q_{i,3,2}$ = 1.40 |

These quantified points $Q_{ijk}$ are also shown in TABLE 2.A.

In the situation where there is no raw data available for a particular artwork on a particular factor, then the raw data field is empty and the corresponding quantified point will be assigned a default value which is 1.00.

Therefore, what is stored in the database of the present invention for artwork $W_{in}$ by artist $A_i$ is not the raw data, but rather a sale price $P_{ij}$ and a collection of quantified points $Q_{ijk}$ for all the value-affecting factors. This feature significantly saves the valuable data storage space to be occupied by the database in the computer system's mass data storage device. This feature also simplifies the future update of the information stored in the database with new sales data.

The third basic step of the present invention appraisal method is to create an imaginary "normal" artwork for each artist. The "normal" artwork for an artist $A_i$ is represented by a normal price $P_{iN}$, which is the average of the prices $P_{ij}$ for artist $A_i$'s $n_i$ artworks:

$$P_{iN}=\Sigma(P_{ij}/n_i) \qquad [2]$$

and a series of "normal" points $Q_{iNk}$, each is the average of the quantified points $Q_{ijk}$ for artist $A_i$'s $n_i$ artworks on a particular value-affecting factors $F_k$:

$$Q_{iNk}=\Sigma(Q_{ijk}/n_i) \qquad [3]$$

Therefore, for the above example, artist A's imaginary "normal" artwork has a normal price of $1,040.00, the normal point for medium is 0.87, and the normal point for size is 1.13, as shown in TABLE 2.A. The collection of these three (3) data is called the "NORM" of artist A.

Once the "NORM" for each artist is determined, it is also stored as the "average information" in the database as part of that artist's record, as illustrated in FIG. 1.

An additional part of artist $A_i$'s artworks:'s record is the "individual adjustment factors" $I_{ip}$ (p=1,2, . . . ,u). These factors will only affect the appraised price of this particular artist and has no effect on other artists. The individual adjustment factors are represented by a plus (+) or minus (−) percentage.

For example, if a specific artist has a major art show in Paris which receives rare reviews world wide, then the value of his or her works will rise a measurable percentage. However, if there is reliable information revealing an artist has hired others to paint and signed his or her name, then the value of such artist's works will decrease by a proper percentage.

In summary, the record of each artist A, stored in the database includes three (3) types of information: (1) personal information; (2) artwork information, which contain, for each artwork $w_{in}$, the sale price $P_{ij}$ and quantified points $Q_{ijk}$ for each value-affecting factor $F_k$; and (3) average information, which include the "NORM" and individual adjustment factors $I_{ip}$ for artist $A_i$.

In addition to the records of individual artists, the database further contains a record of a set of "environmental adjustment factors" $E_{iq}$ (q=1,2, . . . ,v). These factors will affect the appraised price of all works of art. The environmental adjustment factors are also represented by a plus (+) or minus (−) percentage. For example, the nationality of an artist may have an effect on the price of his or her art work. This factor is listed in TABLE 2.E

TABLE 2.E

Nationality of Artist

| Nationality | Point($I_1$) |
|---|---|
| French, Italian | +0.05 |
| Dutch | +0.04 |
| German, American | +0.03 |
| Spanish | +0.02 |
| English | +0.01 |
| Austrian, Swedish, Greek | +0.00 |
| Chinese, Belgian, Turkish | −0.01 |
| Hungarian, Korean, Japanese | −0.02 |
| Vietnamese, Samoan | −0.03 |
| Other not listed nationalities | −0.04 |

Other examples of the environmental adjustment factors include events such as the increase in precious metal prices, or inflation, or bankruptcy of major auctioneers.

The next basic step of the present invention appraisal method is to obtain from a user the information of an artwork which is to be appraised. Such artwork is called the "TARGET". The user needs to provide the following information: (1) personal information of the artist; and (2) raw data $D_{Tk}$ for each value-affecting factor $F_k$. The raw data $D_{Tk}$ is then converted into quantified points $Q_{Tk}$.

For example, suppose artist A has a fourth artwork which is to be appraised. The raw data and the converted quantified points are illustrated in TABLE 3.T.

The fifth basic step of the present invention appraisal method is to calculate the appraised or predicted price of the TARGET. This step involves two procedures: (1) after the name of the artist of the TARGET is known, retrieving from the database the artist's NORM and individual adjustment factors $I_{ip}$; and (2) calculating the predicted price P.

The calculation of the appraised price is based on the artist's NORM ($P_N$ and $Q_{Nk}$), the quantified points $Q_{Tk}$ of the TARGET, individual adjustment factors $I_p$ of the particular artist, and the environmental adjustment factors $E_q$:

$$P = P_N \cdot [\Pi(Q_{Tk}/Q_{Nk}) + \Sigma I_p + \Sigma E_q] \quad [4]$$

TABLE 3.T

Artist t

PERSONAL INFORMATION
  Name    A
  ...

TARGET INFORMATION
| Factors | Raw data | Level | Rate(%) | Q. Point |
|---|---|---|---|---|
| Medium | Mixed medium | $L_{1,6} = 6$ | $R_{1,5} = 60\%$ | $Q_{T,1} = 0.60$ |
| Size | 32" × 40" | $L_{2,6} = 6$ | $R_{2,5} = 140\%$ | $Q_{T,2} = 1.40$ |
| ... | | | | |

"NORM" OF THE ARTIST
  Price    $P_{IN} = \$1,040.00$
  Medium                                    $Q_{IN1} = 0.87$
  Size                                      $Q_{IN2} = 1.13$
  ...

INDIVIDUAL CIRCUMSTANCES FACTORS
  Circumstance                              $I_{ip}(\%)$ In the above example, if the effect of the adjustment factors are disregarded, then the appraised price for artist A's fourth artwork is about $889. This result is consistent with the expected result because the TARGET is about the same as the third painting by artist A, and the price should be close. On the other hand, if the fourth painting is a medium oil painting, then the appraised price is about $1059. This is also consistent with the expected result because if the TARGET is about the same as the first two paintings by artist A, then the price should be close to the average of the first two paintings which is $1,100. This proves that the algorithm of the present invention is a correct algorithm because the result is consistent with what is expected.

Figure 2:
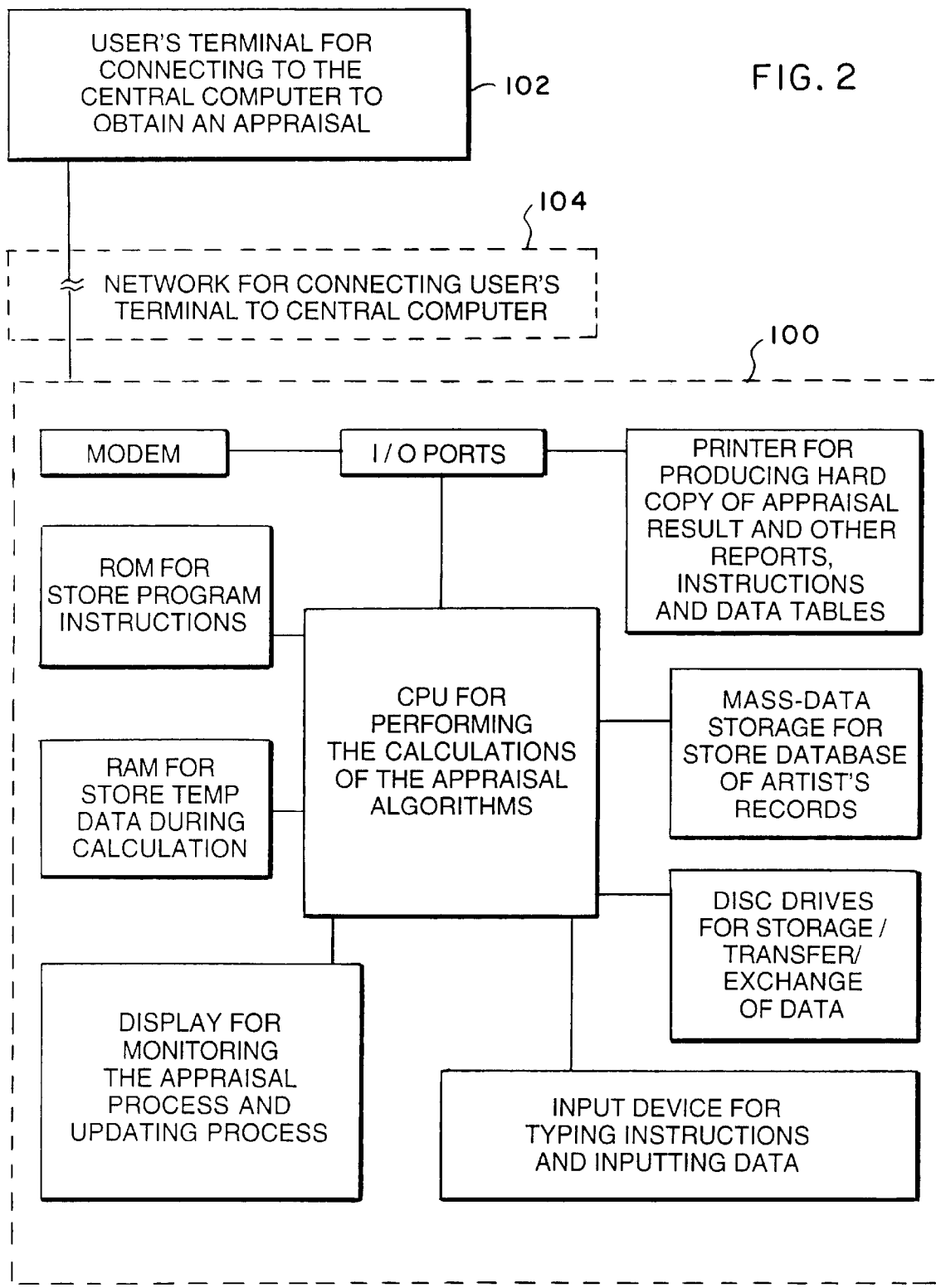
FIG. 2 is an illustrative block diagram of the computer system utilized in the present invention.

Referring to FIG. 2, there is shown a block diagram illustrating the computer system utilized in the present invention appraisal method. The computer system preferably includes a central computer 100. The central computer 100 may include a central processing unit (CPU), a read-only memory (ROM) device, a random-access memory (RAM) device, a mass data storage device such as a hard disc drive (HDD) or a tape drive, a data exchange/transfer/storage device such as a floppy disc drive (FDD) or a compact disc (CD) drive, an input device such as a keyboard, a display device such as a monitor, a multiplicity of input/output (I/O) ports such as serial ports and parallel ports, a printer device such as a laser printer or line printer which is connected to one of the I/O ports, and a telecommunication device such as a modem or fax/modem connected to another one of the I/O ports. A user's terminal 102 can be connected to the central computer 100 through a network device 104 via telecommunication cable-lines such as telephone lines.

Figure 3:
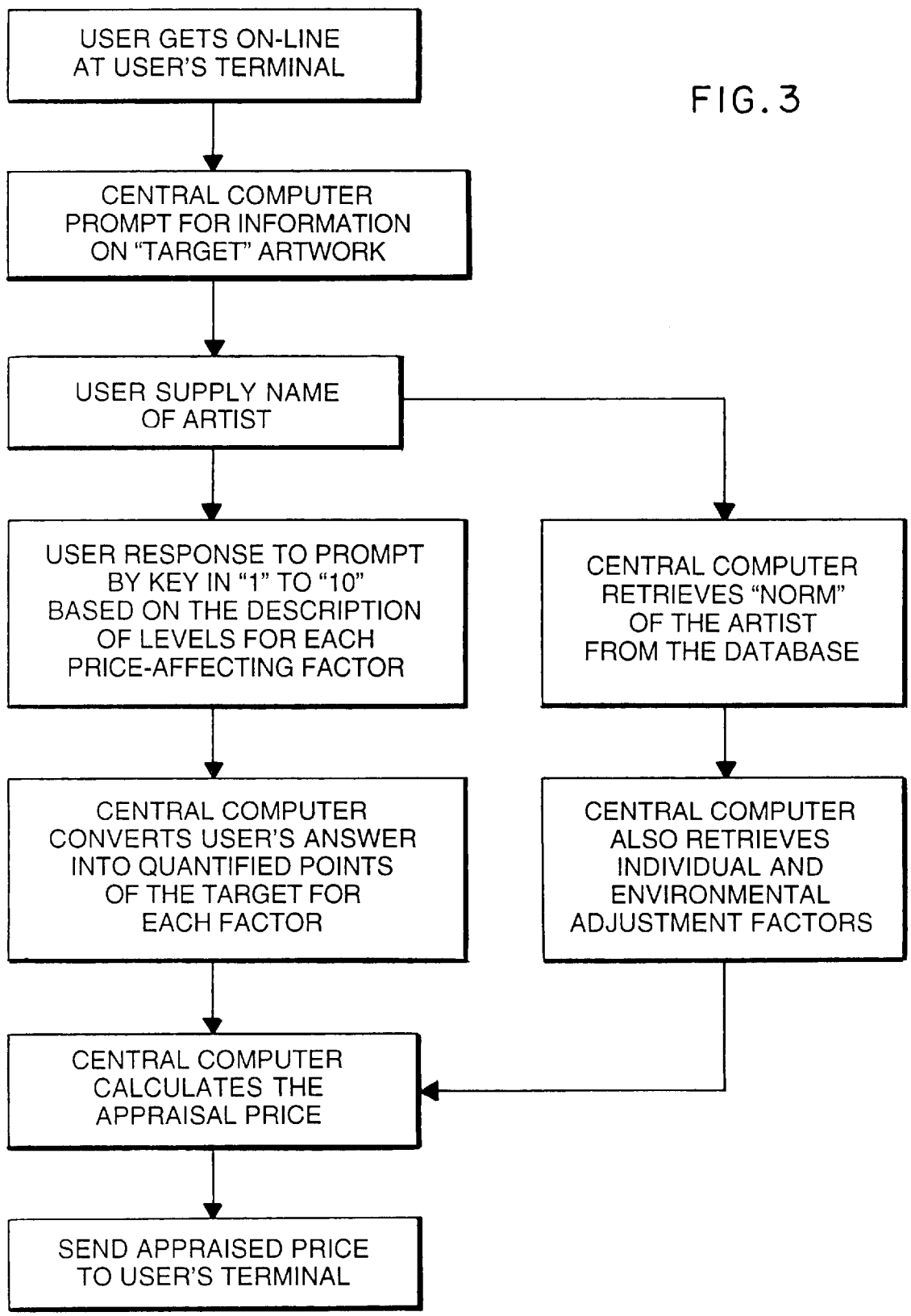
FIG. 3 is a block diagram illustrating the present invention computer-aided appraisal method.

Referring to FIG. 3, there is shown a flow-chart diagram illustrating a sample procedure of the present invention appraisal method. When a user wants to obtain an appraisal for a "TARGET" artwork, the user gets on-line at the user's terminal through the network to connect to the central computer. The central computer will prompt a series questions for the user to answer. The first information about the TARGET to be supplied by the user to the central computer is the name of the author of the TARGET. Then the central computer will go through each value-affecting factor, one at a time, to ask the user to provide an answer to the designated levels of each factor.

For example, the central computer will ask the user about the medium of the TARGET by displaying the 10 levels of the medium factor on the user's terminal, each associated with a number (from 1 to 10), and ask the user to choose one of the levels by typing in the corresponding number. For example, if the TARGET is an oil painting, then the user will type in "5". Meanwhile, the CPU of the central computer will retrieve the artist's NORM and other adjustment factors from the database stored in the mass data storage device.

Once all the information of the TARGET is obtained from the user, the central computer will calculate the appraisal price of the TARGET according to formula [4]. The result will be forwarded to the user's terminal via the network. The central computer may also cause a hard copy to be produced by the printer for record keeping. The whole process any be monitored at the display device of the central computer.

If an artwork of a particular artist is sold, then the operator of the central computer will update the database by imputing this new information into the central computer. The CPU will convert the raw data into quantified points and re-calculate the NORM of that particular artist.

Defined in detail, the present invention is a method of appraising a target artwork by a particular artist, comprising: (a) identifying multiple value-affecting factors, assigning multiple levels to each factor, and determining a relative value-affecting rate for each level; (b) establishing a database of multiple records, each including personal information of an individual artist and information of such individual artist's previously sold artworks corresponding to the value-affecting factors; (c) deriving a normal price and a collection of normal points based on the value-affecting rates assigned to respective levels of the value-affecting factors, and storing the normal price and normal points in the database; (d) gathering information of the target artwork, including the particular artist's name and information of the target artwork corresponding to the value-affecting factors, and converting the information of the target artwork into a collection of quantified points; and (e) retrieving from the database the normal price and the collection of normal points for the particular artist, and calculating an appraised price of the target artwork based on the normal price and the collection of normal points of the particular artist, and the collection of the quantified points of the target artwork.

Defined alternatively, the present invention is a method of utilizing a computer system for appraising a target artwork by a particular artist, comprising: (a) storing in a mass data storage device of the computer system a database of multiple records, each including personal information of an individual artist and information of such individual artist's previously sold artworks corresponding to a multiplicity of value-affecting factors each assigned multiple levels with respective value-affecting rates; (b) computing by a central processing unit of the computer system a normal price and a collection of normal points based on the value-affecting rates assigned to respective levels of the value-affecting factors, and storing the normal price and normal points in the mass data storage device; (c) prompting a series inquiries by the computer system to obtain the particular artist's name and information of the target artwork corresponding to the value-affecting factors; (d) converting by the central processing unit the information of the target artwork into a collection of quantified points; and (e) retrieving from the database stored in the mass-data storage device the normal price and the collection of normal points for the particular artist, and calculating by the central processing unit an appraised price of the target artwork based on the normal price and the collection of normal points of the particular artist, and the collection of the quantified points of the target artwork.

Defined broadly, the present invention is a database stored in a mass data storage device of a computer system, the database comprising: (a) a multiplicity of records of artists, each record including personal information of an individual artist and information of such individual artist's previously sold artworks corresponding to a multiplicity of value-affecting factors each assigned multiple levels with respective value-affecting rates; and (b) the each record further including a normal price and a collection of normal points of the individual artist, derived from the value-affecting rates assigned to respective levels of the value-affecting factors; (c) whereby the personal information and the normal price and collection of normal points of the individual artist are used for calculation of an appraisal price of a target artwork of the individual artist.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

There is no material difference among the present invention's applications of its NORM method to works of art, automobiles, homes, accountants, government programs, politicians, goods and services of any kind, or any entity whatever. Since the NORM has identified the hypothetical exact average unit in all its qualities and price in any identified group, each member of that group is now scientifically comparable to the NORM and each member's respective true dollar value is therefore accurately calculable by the present invention.

The database and the computer software program performing the appraisal functions can all be stored in a portable medium such as a floppy diskette or a compact disc read-only memory (CD-ROM) device. The floppy diskette or the CD-ROM can be supplied to a user so the user can utilize the computer program and the database at the user's own computer system. The database on the floppy diskette or CD-ROM can be periodically updated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A method of appraising a target artwork by a particular artist, comprising:

a. identifying multiple value-affecting factors, assigning multiple levels to each factor, and determining a relative value-affecting rate for each level;

b. establishing a database of multiple records, each including personal information of an individual artist and information of such individual artist's previously sold artworks corresponding to said value-affecting factors;

c. deriving a NORMal price and a collection of NORMal points based on said value-affecting rates assigned to respective levels of said value-affecting factors, and storing the NORMal price and NORMal points in said database, including averaging all of said value-affecting rates assigned to a respective one of said assigned levels on all of said individual artist's previously sold artworks;

d. gathering information of said target artwork, including the particular artist's name and information of the target artwork corresponding to said value-affecting factors, and converting the information of the target artwork into a collection of quantified points, including correlating the information of said target artwork with a respective one of value-affecting rates of said assigned levels of each value-affecting factors; and e. retrieving from said database the NORMal price and the collection of NORMal points for the particular artist, and calculating an appraised price of the target artwork based on said NORMal price and said collection of NORMal points of said particular artist, and said collection of said quantified points of said target artwork.

2. The method as defined in claim 1 wherein said step of deriving a normal price in element "c" further comprising a sub-step of averaging all prices of said individual artist's previously sold artworks.

3. The method as defined in claim 1 wherein said step of gathering information of the target work in element "d" further comprises a sub-step of providing a list of questions each directed at one of said value-affecting factors with answer choices corresponding to said multiple levels assigned thereto.

4. The method as defined in claim 1 wherein said step of calculating said appraised price of said target artwork in element "e" further comprises a sub-step of normalizing each one of said collection of said quantified points of said target artwork with a respective one of said collection of normal points to derive a collection of normalized quantified points of said target artwork.

5. The method as defined in claim 4 wherein said step of calculating said appraised price of said target artwork in element "e" further comprises a sub-step of multiplying said normal price with each one of said collection of said normalized quantified points of said target artwork.

6. The method as defined in claim 1 wherein said step of calculating said appraised price of said target artwork in element "e" further comprises a sub-step of adjusting said appraised price by taking into account of a multiplicity of individual adjustment factors.

7. The method as defined in claim 1 wherein said step of calculating said appraised price of said target artwork in element "e" further comprises a sub-step of adjusting said appraised price by taking into account of a multiplicity of environmental adjustment factors.

8. A method of utilizing a computer system for appraising a target artwork by a particular artist, comprising:

a. storing in a mass data storage device of said computer system a database of multiple records, each including personal information of an individual artist and information of such individual artist's previously sold artworks corresponding to a multiplicity of value-affecting factors each assigned multiple levels with respective value-affecting rates;

b. computing by a central processing unit of said computer system a NORMal price and a collection of NORMal points based on said value-affecting rates assigned to respective levels of said value-affecting factors, and storing the NORMal price and NORMal points in said mass data storage device, including averaging all of said value-affecting rates assigned to a respective one of said assigned levels on all of said individual artist's previously sold artworks;

c. prompting a series inquiries by said computer system to obtain the particular artist's name and information of the target artwork corresponding to said value-affecting factors;

d. converting by said central processing unit said information of the target artwork into a collection of quantified points, including correlating the information of said target artwork with a respective one of value-affecting rates of said assigned levels of each value-affecting factors; and e. retrieving from said database stored in said mass-data storage device the NORMal price and the collection of NORMal points for the particular artist, and calculating by said central processing unit an appraised price of the target artwork based on said NORMal price and said collection of NORMal points of said particular artist, and said collection of said quantified points of said target artwork, and adjusting said appraised price by taking into account of a multiplicity of individual adjustment factors, and further adjusting said appraised price by taking into account of a multiplicity of environmental adjustment factors.

9. The method as defined in claim 8 further comprising the step of connecting said computer system to an on-line network so that a user can utilize said computer system at a remote location.

10. The method as defined in claim 8 further comprising the step of storing said database on a portable mass data storage medium.

11. The method as defined in claim 8 further comprising the step of monitoring the operation of said computer system on a display device.

12. A database stored in a mass data storage device of a computer system, the database comprising:

a. a multiplicity of records of artists, each record including personal information of an individual artist and information of such individual artist's previously sold artworks corresponding to a multiplicity of value-affecting factors each assigned multiple levels with respective value-affecting rates;

b. said each record further including a NORMal price and a collection of NORMal points of said individual artist, derived from said value-affecting rates assigned to respective levels of said value-affecting factors, including averaging all of said value-affecting rates assigned to a respective one of said assigned levels on all of said individual artist's previously sold artworks; and c. using said personal information and said NORMal price and collection of NORMal points of said individual artist for calculation of an appraisal price of a target artwork of said individual artist, including correlating the information of said target artwork with a respective one of value-affecting rates of said assigned levels of each value-affecting factors.

13. The database as defined in claim 12 wherein said multiplicity of price-affecting factors include medium and size.

14. The database as defined in claim 13 wherein said multiple levels assigned to said medium factor include respective levels for oil painting, acrylic, and watercolor.

15. The database as defined in claim 13 wherein said multiple levels assigned to said size factor include respective levels for large, medium and small sizes each corresponding to a range of numerical dimensions.

16. The database as defined in claim 12 wherein said personal information of said individual artist includes name of said individual artist.

17. The database as defined in claim 12 wherein said records of said database further include a multiplicity of individual adjustment factors for each artist.

18. The database as defined in claim 12 wherein said records of said database further include a multiplicity of environmental adjustment factors for all artists.

* * * * *